(12) United States Patent
Hashemzadeh et al.

(10) Patent No.: US 7,498,391 B2
(45) Date of Patent: Mar. 3, 2009

(54) PROCESS FOR PREPARING CATIONIC POLYVINYL ACETALS

(75) Inventors: Abdulmajid Hashemzadeh, Burgkirchen (DE); Bernhard Glaser, Woerth (DE)

(73) Assignee: Kuraray Europe GmbH, Frankfurt am Main (DE)

( * ) Notice: Subject to any disclaimer, the term of this patent is extended or adjusted under 35 U.S.C. 154(b) by 525 days.

(21) Appl. No.: 11/430,397

(22) Filed: May 9, 2006

(65) Prior Publication Data

US 2006/0264572 A1 Nov. 23, 2006

(30) Foreign Application Priority Data

May 18, 2005 (DE) ................ 10 2005 022 853

(51) Int. Cl.
- C08F 20/10 (2006.01)
- C08F 220/10 (2006.01)
- C08F 2/00 (2006.01)
- C08F 118/02 (2006.01)
- C08F 22/26 (2006.01)
- C08F 118/16 (2006.01)
- C08F 122/26 (2006.01)
- C08F 218/16 (2006.01)
- C08F 8/00 (2006.01)

(52) U.S. Cl. .............. 526/217; 526/318; 526/318.4; 526/319; 526/322; 525/61

(58) Field of Classification Search ........... 524/495; 526/318, 318.4, 217
See application file for complete search history.

(56) References Cited

U.S. PATENT DOCUMENTS

| | | | | |
|---|---|---|---|---|
| 2,923,701 | A * | 2/1960 | Schuller et al. | ............. 526/291 |
| 4,248,939 | A | 2/1981 | Parsons | |
| 6,870,009 | B2 | 3/2005 | Stark et al. | |
| 2005/0065272 | A1 | 3/2005 | Vicari | |
| 2007/0244266 | A1 | 10/2007 | Lumpp | |

FOREIGN PATENT DOCUMENTS

| | | |
|---|---|---|
| DE | 296 307 A5 | 11/1991 |
| DE | 10332527 A1 | 2/2005 |
| EP | 0799712 A1 | 4/1997 |
| EP | 0 987 280 A2 | 3/2000 |
| EP | 1 284274 A1 | 2/2003 |
| EP | 1 437 230 A1 | 7/2004 |
| JP | 45037032 A | 11/1970 |
| JP | 57-77051 | 5/1982 |
| JP | 57077051 A | 5/1982 |
| JP | 6-279539 | 10/1994 |
| JP | 2000-225768 | 8/2000 |
| JP | 200225768 A | 8/2000 |
| WO | WO 2005/118653 A1 | 12/2005 |
| WO | 2006002830 A | 1/2006 |

OTHER PUBLICATIONS

Translation of S. Janietz et al., "Investigation of the Radical Copolymerization of Dimethyl Diallyl Ammonium Chloride and Vinyl Acetate and Functionalization Reactions of the Respective Copolymers", Cata Polymer., 43 (1992), pp. 230-234.*
Derwent Abstract corresponding to DD 296307 (AN 1992-141871).
Patent Abstract of Japan, vol. 2000, No. 11, Jan. 3, 2001 corresponding to JP 2000 225768 (Oji Paper Co. Ltd.).
Patent Abstract of Japan, vol. 006, No. 158, Aug. 19, 1982 corresponding to JP-A 57077051 (Kuraray Co. Ltd.).
Derwent Abstract corresponding to DE 10332527 (AN 2005-153988).
Derwent Abstract Corresponding to JP 57-77051.
Derwent Abstract Corresponding to JP 6-279539.
Derwent Abstract Corresponding to JP 2000-225768.
S. Janietz et al., "Untersuchungen zur radikalischen Copolymerisation von Dimethyl-diallyl-ammoniumchlorid mit Vinylacetat und Funktionalisierungs-reaktionen der Copolymere", Acta Polymer., 43, (1992), pp. 230-234.
Derwent Abstract corresponding to DE 296 307 A5 (AN 1992-141871).
Patbase Abstract corresponding to EP 1 284 274 A1.
Patent Abstract of Japan, vol. 2000, No. 11, Jan. 3, 2001 Corr. to JP 2000225768 (Oji Paper Co. Ltd.).

\* cited by examiner

*Primary Examiner*—Marc S. Zimmer
*Assistant Examiner*—Nicole M Buie
(74) *Attorney, Agent, or Firm*—Brooks Kushman P.C.

(57) ABSTRACT

Cationic polyvinyl acetals are prepared by copolymerizing one or more cationic N-alkyldiallylammonium salt monomers with one or more vinyl esters of branched or unbranched carboxylic acids having 1 to 15 carbon atoms, hydrolyzing the resulting copolymers to copolymers containing ≧50 mol % vinyl alcohol units, and acetalizating the vinyl alcohol units with one or more aliphatic aldehydes having 1 to 15 carbon atoms, their acetals, and/or hemiacetals, wherein the copolymerization takes place in a mixture of water and monovalent aliphatic alcohol having a water content of 2% to 35% by weight.

10 Claims, No Drawings

PROCESS FOR PREPARING CATIONIC POLYVINYL ACETALS

BACKGROUND OF THE INVENTION

1. Field of the Invention

The invention relates to a process for preparing cationic polyvinyl acetals, to the products obtainable thereby, and to their use.

2. Background Art

The preparation of polyvinyl acetals from the corresponding polyvinyl alcohols by means of polymer-analogous reaction with the corresponding aldehydes has been known since as early as 1924, the ensuing period having seen the use of a multiplicity of aldehydes to prepare the corresponding polyvinyl acetals. Polyvinyl acetals are prepared in a 3-stage operation (polyvinyl acetate→polyvinyl alcohol→polyvinyl acetal), giving products which along with vinyl acetal groups, also contain vinyl alcohol units and vinyl acetate units. Commercial significance has been acquired in particular by polyvinyl formal, polyvinyl acetal, and polyvinyl butyral.

There are numerous applications in which the adhesion of polyvinyl acetal films to a substrate is inadequate. To improve the adhesion of polyvinyl acetal coating compositions, for example, polyethyleneimine is added. Polyethyleneimine has the drawback, however, of poor compatibility with nitrocellulose, a commonly used solvent for coating materials.

Cationic polyvinyl acetals are employed in a multiplicity of applications. JP-A 57-077051 describes using cationic polyvinyl butyral as an interlayer for safety glass. The cationic groups are introduced by copolymerizing trimethyl(3-acrylamido-3,3-dimethylpropyl)ammonium chloride with vinyl acetate, prior to hydrolysis and acetalization. JP-A 06-279539 describes using cationic, acetalized polyvinyl alcohol as a protective colloid in emulsion polymerization. The cationic group is introduced by means of polymer-analogous reaction of the acetal groups with a cationic compound. In JP-A 2000-225768 the cationic group is also introduced by means of polymer-analogous reaction of the acetal group. That product is used to coat inkjet papers.

These prior-art processes have several distinct disadvantages, including attachment of the cationic group via hydrolysis-sensitive ether, ester or amido groups, and the need for an additional process step in the polymer-analogous reaction. Acta Polymerica 43, 230-34 (1992) describes a process for preparing cationic polyvinyl acetal, wherein in a first step, vinyl acetate is copolymerized with dimethyldiallylammonium chloride in anhydrous methanol at a solids content of 3 to 4 mol %. The copolymer obtained by this step is subsequently hydrolyzed and acetalized. The very low conversion in the copolymerization makes it necessary to remove the residual monomer by repeated reprecipitation.

SUMMARY OF THE INVENTION

An object of the present invention was therefore to modify polyvinyl acetal in such a way as to improve the adhesion of polyvinyl acetal films, and to avoid thixotropic effects in solution. A further object of the invention, was to make the cationic polyvinyl acetal available in a very hydrolysis-stable form and to provide access to it by a process which allows its economical industrial preparation. These and other objects have been achieved with cationically modified polyvinyl acetals.

DETAILED DESCRIPTION OF THE PREFERRED EMBODIMENT(S)

The invention thus provides a process for preparing cationic polyvinyl acetals by copolymerization of one or more cationic monomers which are N-alkyldiallylammonium salts of one or more vinyl esters of branched or unbranched carboxylic acids having 1 to 15 carbon atoms, hydrolysis of the resulting copolymers to hydrolyzed copolymers containing $\geq 50$ mol % vinyl alcohol units, and acetalization of the vinyl alcohol units with one or more aliphatic aldehydes having 1 to 15 carbon atoms, their acetals and/or hemiacetals, the copolymerization being conducted in a mixture of water and monovalent aliphatic alcohol having a water content of 2% to 35% by weight.

Suitable vinyl esters are vinyl esters of branched or unbranched carboxylic acids having 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 5 to 15 carbon atoms, such as VeoVa9® or VeoVa10R® (trade names of Resolution Products). Particular preference is given to vinyl acetate.

Besides the vinyl ester units, optionally, further monomers, for example methacrylic esters and acrylic esters of alcohols having 1 to 15 carbon atoms, olefins, dienes, vinylaromatics, and vinyl halides, may be copolymerized. Suitable (meth)acrylic ester monomers include esters of branched or unbranched alcohols having 1 to 15 carbon atoms. Preferred methacrylic or acrylic esters are methyl acrylate, methyl methacrylate, ethyl acrylate, ethyl methacrylate, propyl acrylate, propyl methacrylate, n-, iso-, and tert-butyl acrylates, n-, iso-, and tert-butyl methacrylates, 2-ethylhexyl acrylate, and norbornyl acrylate. Particular preference is given to methyl acrylate, methyl methacrylate, n-, iso-, and tert-butyl acrylate, 2-ethylhexyl acrylate, and norbornyl acrylate. Suitable dienes include 1,3-butadiene and isoprene. Examples of polymerizable olefins include ethene and propene. Vinylaromatics which can be copolymerized include styrene and vinyltoluene. From the group of the vinyl halides it is usual to use vinyl chloride, vinylidene chloride or vinyl fluoride, preferably vinyl chloride. The fraction of these comonomers is calculated such that the fraction of vinyl ester monomer is $\geq 50$ mol % in the vinyl ester polymer. Mixtures of these comonomers may of course be used.

Where appropriate, it is possible to copolymerize further, auxiliary monomers, preferably in a fraction of 0.01% to 20% by weight, based on the total weight of the comonomers. Examples include ethylenically unsaturated monocarboxylic and dicarboxylic acids, preferably crotonic acid, acrylic acid, methacrylic acid, fumaric acid, and maleic acid; ethylenically unsaturated carboxamides and carbonitriles, preferably N-vinylformamide, acrylamide, and acrylonitrile; cyclic amides carrying an unsaturated group on the nitrogen, such as N-vinylpyrrolidone; monoesters and diesters of fumaric acid and maleic acid such as the diethyl and diisopropyl esters, and also maleic anhydride, ethylenically unsaturated sulfonic acids and/or their salts, preferably vinylsulfonic acid, and 2-acrylamido-2-methylpropanesulfonic acid. Further suitable auxiliary monomers include vinyl ethers, vinyl ketones, and further vinylaromatic compounds, which may also possess heteroatoms.

Suitable auxiliary monomers are also polymerizable silanes and mercaptosilanes. Preference is given to γ-acryloyloxy- and γ-methacryloyloxypropyltri(alkoxy)silanes, α-methacryloyloxymethyltri(alkoxy)silanes, γ-methacryloyloxypropylmethyldi(alkoxy)silanes, vinylalkyldi(alkoxy)silanes, and vinyltri(alkoxy)silanes. Examples of alkoxy groups which can be used include methoxy, ethoxy, methoxyethylene, ethoxyethylene, methoxypropylene glycol ether, and ethoxypropylene glycol ether radicals. Further examples of auxiliary monomers are functionalized (meth)acrylates, particularly epoxy-functional monomers such as glycidyl acrylate, glycidyl methacrylate, allyl glycidyl ether, vinyl glycidyl ether, hydroxyalkyl-functional monomers such as hydroxyethyl(meth)acrylate, and substituted or unsubstituted aminoalkyl(meth)acrylates. Further examples are pre-crosslinking comonomeres such as polyethylenically unsaturated comonomers, examples being divinyl adipate, diallyl maleate, allyl methacrylate, butanediol diacrylate or triallyl cyanurate; or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, and alkyl ethers or esters of N-methylolacrylamide, of N-methylolmethacrylamide, and of N-methylolallylcarbamate, for example their isobutoxy ethers.

Preferred cationic monomers are diallyldialkylammonium halides having $C_{1-4}$ alkyl radicals. Maximum preference is given to diallyldimethylammonium chloride (DADMAC). In general the cationic comonomer is copolymerized in a fraction of 0.01% to 10% by weight, preferably 0.5% to 5% by weight, most preferably 3% to 5% by weight, based in each case on the total weight of the comonomers of the solid vinyl ester resin.

The polymerization takes place in a mixture of water and monohydric aliphatic alcohol, with a water fraction of 2% to 35% by weight, preferably 4% to 20% by weight. Suitable alcohols are alkanols with $C_{1-6}$ alkyl radical. Preference is given to methanol, ethanol, and isopropanol.

The polymerization is conducted under reflux at a temperature of 40° C. to 100° C. and initiated free-radically by adding typical initiators. Examples of typical initiators are azo initiators, percarbonates such as cyclohexyl peroxydicarbonate, peresters such as tert-butyl perneodecanoate or tert-butyl perpivalate, and peroxides such as tert-butyl hydroperoxide. The molecular weight can be adjusted in known manner by addition of molecular weight regulators, by varying the solvent content, by varying the initiator concentration, and by varying the temperature. When polymerization has been concluded, the solvent and any excess monomer and regulator are preferably removed by distillation.

The vinyl ester copolymers are hydrolyzed in conventional manner, by the belt or kneader method for example, in an alkaline or acidic system, with the addition of acid or base. Preferably the solid cationic vinyl ester resin is taken up in alcohol, methanol for example, establishing a solids content of 10% to 80% by weight. Hydrolysis is preferably conducted in a basic system, through addition of NaOH, KOH or NaOCH₃, for example. The base is used generally in an amount of 1 to 5 mol % per mole of ester units. The hydrolysis is preferably conducted at temperatures from 25° C. to 80° C. When hydrolysis has been concluded, the solvent is removed by distillation and the hydrolyzed vinyl ester copolymer is obtained as a powder. Alternatively the hydrolyzed vinyl ester copolymer can be recovered as an aqueous solution by successive addition of water during distillative removal of the solvent.

Vinyl ester copolymers termed "fully hydrolyzed" are those polymers whose degree of hydrolysis is ≧96 mol %. Partly hydrolyzed vinyl ester copolymers are those having a degree of hydrolysis ≧50 mol % and <96 mol %. The partly or fully hydrolyzed vinyl ester copolymers preferably have a degree of hydrolysis of 50 mol % to 99.9 mol %, more preferably of 70 mol % to 99.9 mol %, most preferably of 96 mol % to 99.9 mol %. The viscosity of the vinyl ester copolymer (DIN 53015, Höppler method; 4% strength solution in water) is 1 to 40 mPas, preferably 1 to 6 mPas, and serves as a measure of the molecular weight and of the degree of polymerization.

The acetalization takes place with one or more aliphatic or aromatic aldehydes having 1 to 15 carbon atoms. Preferred aldehydes include the aliphatic aldehydes with 1 to 15 carbon atoms, for example formaldehyde, acetaldehyde, propionaldehyde, and, most preferably, butyraldehyde, or a mixture of butyraldehyde and acetaldehyde. Aromatic aldehydes which can be used include, for example, benzaldehyde or its derivatives. The degree of acetalization is 1 to 80 mol %, preferably 1 to 25 mol %, and more preferably 40 to 80 mol %.

For the acetalization the hydrolyzed vinyl ester copolymers are preferably taken up in an aqueous medium. It is usual to establish a solids content of 5 to 30% in the aqueous solution. Acetalization takes place in the presence of acidic catalysts, examples being hydrochloric acid, sulfuric acid, nitric acid or phosphoric acid. The pH of the solution is preferably set to levels <1 by addition of 20% strength hydrochloric acid.

Following the addition of the catalyst the solution is cooled, preferably to −10° C. to +30° C. The acetalization reaction is triggered by addition of the aldehyde. The amount added is guided by the desired degree of acetalization. When the addition of the aldehyde is concluded, acetalization is completed by heating of the batch at 20° C. to 60° C. for a number of hours with agitation, preferably for 1 to 6 hours, the pulverulent reaction product being isolated by filtration and a downstream washing step. For the purpose of stabilization it is possible, furthermore, to add alkali. In the course of the precipitation and the aftertreatment it is possible to operate with emulsifiers in order to stabilize the aqueous suspension of the cationic polyvinyl acetal.

The procedure according to the invention provides access to cationic polyvinyl acetals which, as compared with their existing counterparts, possess significantly improved adhesion to critical substrates, thereby making it unnecessary to add adhesion promoters.

In the printing-inks industry in particular there is a need for binders with excellent adhesion to flexible films of different polymers, in order thus to make it possible to provide printing inks which, following application, are joined very firmly to the substrate and hence are very difficult to detach from the printed substrate. On the basis of the outstanding adhesion of the cationic polyvinyl acetals, their favorable interaction with pigments, as well as the resultant advantageous (printing-ink) rheology, they are particularly suitable for use in printing-ink compositions.

Suitable printing-ink formulations are known to the skilled worker and include in general a 5% to 25% by weight pigment fraction, of diazo or phthalocyanine pigments for example, 5% to 25% by weight of polyvinyl acetal binder, and solvents, examples being alcohols such as ethanol, or esters such as ethyl acetate. It is also possible for further additives to be present, for example retardants, plasticizers, and other adjuvants such as fillers or waxes. Adhesion promoters are no longer vital.

For laminated safety glass and glass composites, and high-security glass or glazing films, the cationic polyvinyl acetals are highly suitable, since in addition to further-improved adhesion to glass, it is also possible to obtain a higher tensile strength. The use of other polymer films in these applications, such as PET films, can likewise be recommended, since the cationic polyvinyl acetals and the films produced from them adhere very well not only to the glass surface but also to the surface of these other polymer films, so making the addition of adhesion promoters superfluous.

The cationic polyvinyl acetals may also be used, as protective colloids for aqueous dispersions, for example in the polymerization of monomers in aqueous medium, and in the preparation of dispersion powders which are redispersible in water. The cationic polyvinyl acetals may be employed, further, in aqueous coating compositions, or solvent-based compositions. The cationic polyvinyl acetals may also be used as binders in corrosion control compositions, the improved adhesion being a particular advantage. Furthermore, the cationic polyvinyl acetals are also suitable for use as binders in the ceramics industry, especially as binders for ceramic green bodies. Also deserving of mention is their use as binders for ceramic powders and metal powders in powder injection molding, and as binders for coating the inside of cans.

The examples given below serve to further illustrate the invention without restricting it in any way whatsoever.

Preparation of vinyl acetate copolymers:

EXAMPLE 1

5 % by Weight DADMAC

| | Initial charge: |
|---|---|
| 14.1 g | DADMAC (64% in water) |
| 580.7 g | methanol |
| 1.36 g | tert-butyl peroxypivalate (75% in water) |
| 171.2 g | vinyl acetate |
| | Solution 1: |
| 1040 g | vinyl acetate |
| | Solution 2: |
| 85.79 g | DADMAC (64% in water) |
| | Solution 3: |
| 99.47 g | methanol |
| 11.70 g | tert-butyl peroxypivalate (75% in water) |

The initial charge was heated under nitrogen with stirring (95 rpm), and under reflux, was maintained at 60° C. to 65° C. After 15 minutes 2.18 g of tert-butyl peroxypivalate (PPV) were added. After 45 minutes the 3 solutions were metered into the reactor (metering time 225 min). 30 min after the conclusion of metering, 0.273 g of tert-butyl peroxypivalate was added to the reactor, followed by stirring at reflux for a further 2 hours and subsequently cooling of the polymer solution. This gave a clear polymer solution.

EXAMPLE 2

5% by Weight DADMAC

The procedure of Example 1 was followed, but with the amount of initiator reduced from 0.9% to 0.45% by weight, based on monomer weight.

EXAMPLE 3

5% by Weight DADMAC

The procedure of Example 1 was followed, but with the amount of initiator reduced from 0.9% to 0.2% by weight, based on monomer weight.

EXAMPLE 4

8% by Weight DADMAC

| | Initial charge: |
|---|---|
| 22.54 g | DADMAC (64% in water) |
| 563.9 g | methanol |
| 0.68 g | tert-butyl peroxypivalate (75% in water) |
| 165.87 g | vinyl acetate |
| | Solution 1: |
| 1010 g | vinyl acetate |
| | Solution 2: |
| 137.3 g | DADMAC (64% in water) |
| | Solution 3: |
| 97.35 g | methanol |
| 5.85 g | tert-butyl peroxypivalate (75% in water) |

The initial charge was heated under nitrogen with stirring (95 rpm), and under reflux was maintained at 60° C. to 65° C. After 15 minutes 1.09 g of tert-butyl peroxypivalate (PPV) were added. After 45 minutes the 3 solutions were metered into the reactor (metering time 225 min). 30 min after the conclusion of metering, 0.136 g of tert-butyl peroxypivalate was added to the reactor, followed by stirring at reflux for a further 2 hours and subsequently cooling of the polymer solution. This gave a clear polymer solution.

EXAMPLE 5

3% by Weight DADMAC

As in Example 2, but with 3% by weight of DADMAC. A clear polymer solution was obtained.

COMPARATIVE EXAMPLE 6

12 % by Weight DADMAC

As in Example 2, but with 12% by weight of DADMAC. A clear polymer solution was obtained.

COMPARATIVE EXAMPLE 7

No DADMAC

As in Example 2, but without DADMAC. A clear polymer solution was obtained.

COMPARATIVE EXAMPLE 8

8% by Weight DADMAC

The procedure of Example 4 was followed, but, instead of 563.9 g of methanol in the initial charge, 353.9 g of methanol and 210 g of water (water fraction raised from 9% to 38% by weight) were used as solvents. A turbid polymer solution was obtained.

Hydrolysis:

The resin solutions obtained were each hydrolyzed to the corresponding polyvinyl alcohol using the following procedure. 1544 g of a resin solution adjusted to 34% by weight solids content were overlayered with 105 g of methanol. Then, following addition of 117 g of a 4.8% strength by weight methanolic NaOH solution, stirring (200 rpm) was commenced at 30° C. After 120 minutes the hydrolysis was terminated with acetic acid (to set a pH of 7). The precipitated vinyl alcohol copolymer was isolated by filtration, washed with methanol, and dried.

Acetalization:

The resin solutions obtained in accordance with the Inventive and Comparative Examples 1 to 7, following their hydrolysis, were each acetalized with butyraldehyde, using the following procedure. In an initial charge of 950 ml of fully demineralized water, 950 ml of a 10% strength solution of a vinyl alcohol copolymer and 507 ml of HCl (20%) were stirred at 420 rpm and the resulting solution was cooled to −3° C. Then 101.5 ml of butyraldehyde were metered in over 45 minutes. After the 45-minute metering time the suspension was held at −3° C. for a further 40 minutes, before then being heated to 25° C. over 105 minutes. Reaction was continued to completion at this temperature for 90 minutes. Thereafter the suspension was filtered and the solid product was washed repeatedly with fully demineralized water and dried.

This gave the following products:

PVB 1: Höppler viscosity (DIN 53015, 10% in ethanol) 14.9 mPa·s.
PVB 2: Höppler viscosity (DIN 53015, 10% in ethanol) 22.6 mPa·s.
PVB 3: Höppler viscosity (DIN 53015, 10% in ethanol) 32.9 mPa·s.
PVB 4: Höppler viscosity (DIN 53015, 10% in ethanol) 19.8 mPa·s.
PVB 5: Höppler viscosity (DIN 53015, 10% in ethanol) 17.0 mPa·s.

COMPARATIVE EXAMPLE PVB 6

Höppler viscosity (DIN 53015, 10%): not possible to measure.

COMPARATIVE EXAMPLE PVB 7

Höppler viscosity (DIN 53015, 10% in ethanol) 16.0 mPa·s

Preparation of Printing Inks:

Each of the polyvinyl butyrals was used to prepare a varnish having a flow time to DIN 53211 of 40 seconds in the DIN cup (nozzle 4 mm). Then 20.8 parts by weight of each varnish were mixed with 21.7 parts by weight of a solvent mixture of ethanol and methoxypropanol (4:1 parts by weight) and with 7.5 parts by weight of pigment (red Irgalith® Rubin 4BGL, blue Irgalith® Blau GLO) in a disperser for 60 minutes.

Rheological Measurement:

The rheology was measured after one day using a cone-and-plate rheometer with the following settings: diameter 50 mm, angle 1°. Upward and downward curve each from 0.2/sec to 1000/sec over one minute. The viscosity was measured at shear rates D of 10/s, 100/s, and 1000/s, and the upward curve at $D_A=10/s$.

The results are summarized in the table below:

| Irg. Blau GLO | Comp. Ex. 7 | PVB 1 | PVB 2 | PVB 3 | PVB 4 | PVB 5 |
|---|---|---|---|---|---|---|
| D = 10/s | 1280 | 305 | 247 | 62 | 172 | 496 |
| D = 100/s | 219 | 175 | 114 | 51 | 106 | 155 |
| D = 1000/s | 67 | 68 | 58 | 45 | 61 | 69 |
| $D_A = 10/s$ | 258 | 112 | 100 | 61 | 91 | 131 |
| $D_{down}/D_{up}$ 10/s | 5.0 | 2.7 | 2.5 | 1.0 | 1.9 | 3.7 |

| Irg. Yellow XLP | Comp. Ex. 7 | PVB 1 | PVB 2 | PVB 3 | PVB 4 | PVB 5 |
|---|---|---|---|---|---|---|
| D = 10/s | 2420 | 391 | 315 | 198 | 618 | 496 |
| D = 100/s | 337 | 327 | 267 | 122 | 215 | 155 |
| D = 1000/s | 97 | 103 | 86 | 72 | 88 | 69 |
| $D_A = 10/s$ | 366 | 186 | 210 | 159 | 187 | 131 |
| $D_{down}/D_{up}$ 10/s | 6.6 | 2.1 | 1.5 | 1.3 | 3.3 | 3.7 |

The results show that unfunctionalized polyvinyl butyral (Comp. Ex. 7) results in significantly higher viscosities than with the DADMAC-functionalized polyvinyl butyrals from Example 1 to 5. Furthermore, it is only with the DADMAC-functionalized polyvinyl butyrals that a significantly lower propensity toward thioxotropy is obtianed in the upward and downward curves ($D_{down}/D_{up}$ 10/s).

At excessive concentrations of DADMAC (Comp. Ex. 6; 12% by weight DADMAC) the copolymer remains water-soluble following acetalization. In this case it was not possible to isolate and purify the product in the form of a suspension. Water-soluble polyvinyl butyrals can be purified only with expensive methods such as dialysis, activated carbon or ion exchanger. Moreover, above a certain concentration of DADMAC, the water resistance of the polyvinyl butyrals deteriorates significantly.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing cationic polyvinyl acetals, comprising copolymerizing one or more cationic N-alkyldiallylammonium salt monomers with one or more vinyl esters of branched or unbranched carboxylic acids having 1 to 15 carbon atoms to form a vinyl ester copolymer; hydrolyzing the vinyl ester copolymer to a hydrolyzed copolymer containing >50 mol % vinyl alcohol units; and acetalizing vinyl alcohol units with one or more aliphatic aldehydes having 1 to 15 carbon atoms, their acetals, hemiacetals, or mixtures thereof, wherein copolymerizing takes place in a mixture of water and monovalent aliphatic alcohol having a water fraction of 2% to 35% by weight, and the cationic polyvinyl acetal product is isolated as a suspension or dispersion in water, or as a solid from aqueous dispersion or suspension.

2. The process of claim 1, wherein a diallyldialkylammonium halide having $C_{1-4}$ alkyl radicals is copolymerized as a cationic monomer.

3. The process of claim 1, wherein diallyldimethylammonium chloride is copolymerized as a cationic monomer.

4. The process of claim 1, wherein the cationic monomer is copolymerized in a fraction of 0.01% to 10% by weight, based on the total weight of the comonomers of the vinyl ester copolymer.

5. The process of claim 2, wherein the cationic monomer is copolymerized in a fraction of 0.01% to 10% by weight, based on the total weight of the comonomers of the vinyl ester copolymer.

6. The process of claim 1, wherein the polymerization takes place in a mixture of water and a monovalent aliphatic alcohol having a $C_{1-6}$ alkyl radical.

7. The process of claim 2, wherein the polymerization takes place in a mixture of water and a monovalent aliphatic alcohol having a $C_{1-6}$ alkyl radical.

8. The process of claim 4, wherein the polymerization takes place in a mixture of water and a monovalent aliphatic alcohol having a $C_{1-6}$ alkyl radical.

9. The process of claim 1, further comprising separating a cationic polyvinyl acetal copolymer by filtration.

10. The process of claim 9, further comprising admixing the polyvinyl acetal copolymer with one or more pigments to form a printing ink composition.

* * * * *